United States Patent
Wang et al.

(10) Patent No.: US 10,931,445 B2
(45) Date of Patent: Feb. 23, 2021

(54) METHOD AND SYSTEM FOR SESSION KEY GENERATION WITH DIFFIE-HELLMAN PROCEDURE

(71) Applicant: Huawei International Pte. Ltd., Singapore (SG)

(72) Inventors: Haiguang Wang, Singapore (SG); Jie Shi, Singapore (SG); Xin Kang, Singapore (SG)

(73) Assignee: HUAWEI INTERNATIONAL PTE LTD., The Signature (SG)

(*) Notice: Subject to any disclaimer, the term of this patent is extended or adjusted under 35 U.S.C. 154(b) by 145 days.

(21) Appl. No.: 15/977,220

(22) Filed: May 11, 2018

(65) Prior Publication Data
US 2018/0331829 A1  Nov. 15, 2018

Related U.S. Application Data

(63) Continuation of application No. PCT/SG2016/050530, filed on Oct. 28, 2016.

(30) Foreign Application Priority Data

Nov. 12, 2015  (SG) .......................... 10201509342W (51) Int. Cl.
*H04L 9/08* (2006.01)
*H04W 12/06* (2021.01)
(Continued)

(52) U.S. Cl.
CPC .......... *H04L 9/0844* (2013.01); *H04L 9/0869* (2013.01); *H04L 9/14* (2013.01);
(Continued)

(58) Field of Classification Search
None
See application file for complete search history.

(56) References Cited

U.S. PATENT DOCUMENTS

2002/0018569 A1* 2/2002 Panjwani .............. H04L 63/061
                                                                 380/247
2002/0076054 A1 6/2002 Fukutomi et al.
(Continued)

FOREIGN PATENT DOCUMENTS

CN          101640886 A         2/2010
CN          101951590 A         1/2011
(Continued)

OTHER PUBLICATIONS

3GPP TS 33.401 V12.12.0, "3rd Generation Partnership Project; Technical Specification Group Services and System Aspects; 3GPP System Architecture Evolution (SAE); Security architecture (Release 12)", Sep. 2014 (Year: 2014).*
(Continued)

*Primary Examiner* — Henry Tsang
(74) *Attorney, Agent, or Firm* — Kilpatrick Townsend & Stockton LLP (57) ABSTRACT

Embodiments of the invention provide methods and apparatuses for session key generation, which use Diffie-Hellman procedure in both user equipment and network to prevent an attacker from breaking the session key by simply listening to signal exchanges passively when the attacker possesses credentials of a USIM card.

16 Claims, 7 Drawing Sheets

(51) Int. Cl.
  *H04L 9/14* (2006.01)
  *H04L 9/30* (2006.01)
  *H04L 9/32* (2006.01)
(52) U.S. Cl.
  CPC .......... *H04L 9/3013* (2013.01); *H04L 9/3066* (2013.01); *H04L 9/3242* (2013.01); *H04W 12/0608* (2019.01)

(56) References Cited

U.S. PATENT DOCUMENTS

| | | |
|---|---|---|
| 2006/0005026 A1 | 1/2006 | Song et al. |
| 2006/0095766 A1 | 5/2006 | Zhu et al. |
| 2009/0313472 A1 | 12/2009 | Guccione et al. |
| 2011/0107101 A1 | 5/2011 | Funk |
| 2011/0238972 A1 | 9/2011 | Semple et al. |
| 2013/0080769 A1* | 3/2013 | Cha .................. H04L 63/168 713/155 |
| 2013/0243194 A1 | 9/2013 | Hawkes et al. |
| 2014/0041022 A1* | 2/2014 | Small .................. H04L 41/0654 726/22 |
| 2016/0255064 A1* | 9/2016 | Naslund .................. H04L 63/08 726/3 |
| 2017/0006469 A1* | 1/2017 | Palanigounder ........ H04L 9/085 |

FOREIGN PATENT DOCUMENTS

| | | |
|---|---|---|
| CN | 102037707 A | 4/2011 |
| CN | 102664725 A | 9/2012 |
| CN | 102724665 A | 10/2012 |
| CN | 101969638 B | 8/2013 |
| EP | 3328108 A1 | 5/2018 |
| JP | 2008530861 A | 6/2008 |
| JP | 2014527379 A | 10/2014 |
| KR | 20050060636 A | 6/2005 |
| KR | 20050117086 A | 12/2005 |
| KR | 20140066230 A | 5/2014 |

OTHER PUBLICATIONS

Wikipedia, "Diffie—Hellman key exchange", Feb. 2010 (Year: 2010).*

Law et al., "An Efficient Protocol for Authenticated Key Agreement", Kluwer Academic Publishers, 2003 (Year: 2003).*

Papaioannou, P. et al., Secure Elliptic Curve Generation and Key Estabiishme..nt on a 802.11 WLAN Embedded Device, Proceedings ISADS 2009. 2009, p. 1-6.

Zhou Chi et al., "Security analysis and improvement of LTE authentication and key agreement protocol",Modern Electronics Technique, vol. 37 No. 18,dated Sep. 2014,with an English translation,total 13 pages.

Andrew Griffin,"Intelligence agencies tried to steal important data as it was passed between phone networks and Sim card maker",dated Feb. 25, 2015,total 2 pages.

3GPP TS 33.102 V122.0 (Dec. 2014),3rd Generation Partnership Project;Technical Specification Group Services and System Aspects;3G Security;Security architecture(Release 12),dated Dec. 2014,total 76 pages.

3GPP TS 33.401 V13.0.0 (Sep. 2015),3rd Generation Partnership Project;Technical Specification Group Services and System Aspects;3GPP System Architecture Evolution (SAE);Security architecture(Release 13),dated Sep. 2015,total 131 pages.

eUICC Profile Package:Interoperable Format Technical Specification Version 1.0.1,SIMalliance ltd,dated Jul. 6, 2015, total 66 pages.

Euchner, M., HMAC—Authenticated Diffie-Hellman for Multimedia Internet KEYing (MIKEY), Request for Comments, 4650, Sep. 2006, p. 1-27,total 27 pages.

* cited by examiner

Figure 9

METHOD AND SYSTEM FOR SESSION KEY GENERATION WITH DIFFIE-HELLMAN PROCEDURE

CROSS-REFERENCE TO RELATED APPLICATIONS

This application is a continuation of International Application No. PCT/SG2016/050530, filed on Oct. 28, 2016, which claims priority to Singapore Patent Application No. SG10201509342W, filed on Nov. 12, 2015. The disclosures of the aforementioned applications are hereby incorporated by reference in their entireties.

TECHNICAL FIELD

Embodiments of the invention relate to application of Diffie-Hellman procedure in session key generation for LTE, 5G or WLAN networks, which may take place during or after mutual authentication.

BACKGROUND

To protect mobile devices and networks from being eavesdropped or manipulated during data communication, mutual authentications are employed in the 4G networks to ensure the mobile devices, or normally named as user equipment (UE) and networks are genuine. To perform mutual authentication, both UE and networks are required to retain some credentials that can establish the identity of each other.

In 3G/4G networks, at the network side, the credentials are kept in servers named Home Subscriber Server (HSS); while at the UE side, the credentials are kept in an isolated device named Universal Subscriber Identity Module (USIM) card. The USIM card is a computing device embedded in a USIM slot inside a UE. USIM and UE can exchange information via a special interface. Currently, 3G/4G networks use symmetric keys in the mutual authentication. Hence, for a given International Mobile Subscriber Identification (IMSI), the credentials kept in the corresponding USIM and HSS are the same.

When UE wants to access network and transmits data, it has to attach to a network first. Authentication is performed during the attachment and authentication procedure known as Evolved Packet System Authentication and Key Agreement (EPS AKA).

Figure 1:
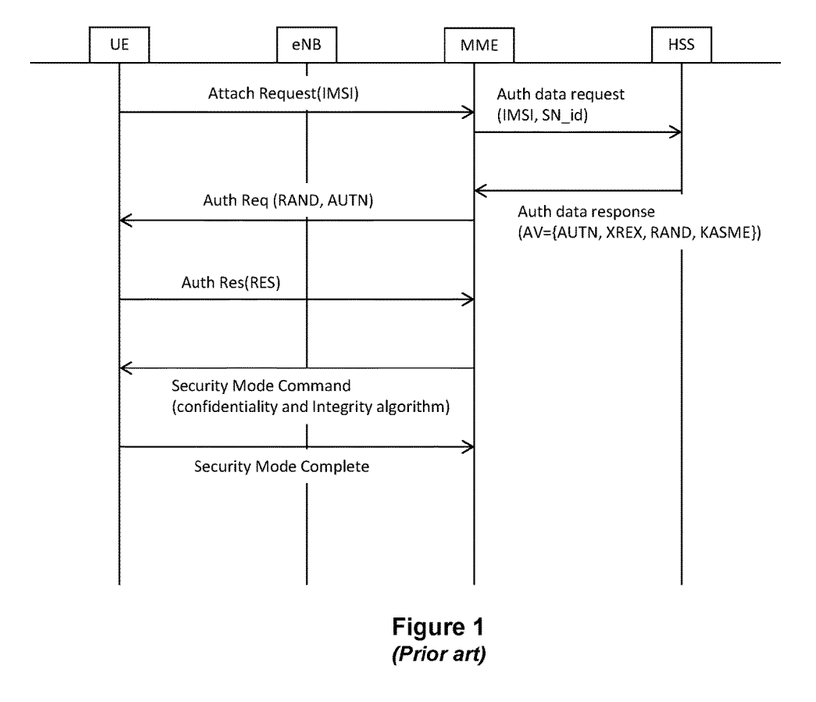
FIG. 1 shows an existing authentication signaling exchanging procedure.

In the EPS AKA procedure, UE first sends an Attach Request to the Mobility Management Entity (MME) via the Evolved Node B (eNodeB). The MME forwards the Attach request to the HSS which subsequently generates an authentication vector based on the credentials shared with UE. The authentication vectors are sent to MME which subsequently sends authentication material to UE. UE authenticates the network and then sends an authentication code to MME. MME verifies the authentication code and authenticates the UE. After authentication, UE exchanges key material with MME and eNB to further generate session keys for control and data plane. FIG. 1 shows an existing authentication signaling exchanging procedure.

Figure 2:
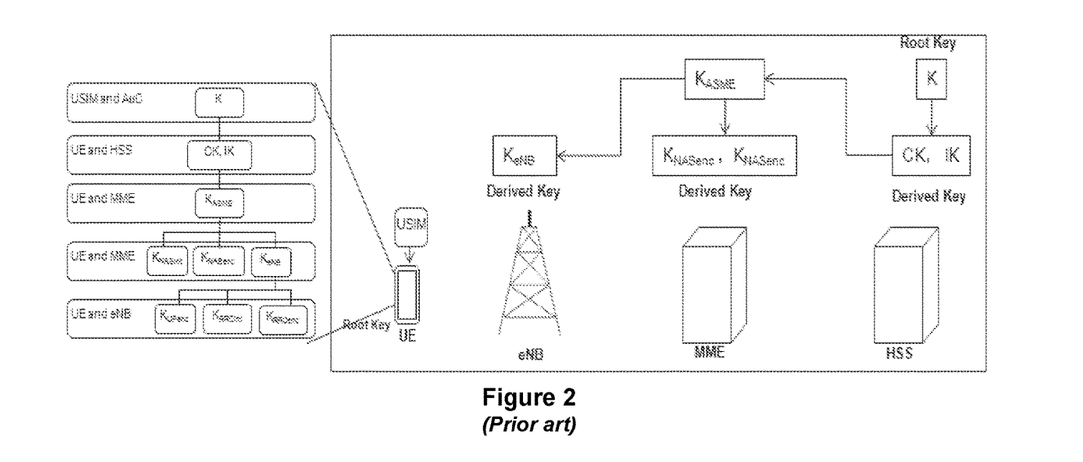
FIG. 2 shows key architecture of the Long-Term Evolution (LTE) network.

FIG. 2 shows key architecture of the Long-Term Evolution (LTE) network. All the keys are derived based on the root key kept in USIM and HSS, and also the parameters exchanged between UE and core network. It has been proved that the session keys generated for control and data plane with aforementioned procedure are secure provided the root keys are not disclosed. However, if roots key for SIM card have been stolen, this implies that the credentials in the USIM may have been disclosed. Disclosure of the USIM card credentials to attackers results in serious security risks. With the current system, once credentials in the SIM card is exposed to attackers, attackers can derive the user's session key by eavesdropping to the attachment and authentication signaling exchanges between UE and network.

Another technical trend is that mobile industry needs a more flexible design to support update or change of the credentials kept in the USIM. These credentials may be exposed to third parties and increases the security risks.

To overcome the issue of exposing USIM card credentials to third party or being accidentally stolen, one way is to enhance the session key generation with stronger forward secrecy technology, for example, the Diffie-Hellman procedure. Another possible way is to employ new authentication technology such as authentication based on public key.

CN 101969638 B provides a method for protecting international mobile subscriber identity (IMSI) in mobile communication. By protecting IMSI with the public key in the Attach Request transmission as proposed in CN 101969638 B, it increases the difficulty for the attackers to break the session key of the relative user even if the credentials in the SIM card are disclosed. The reason is that without knowing the IMSI, the attackers do not know which credentials can be used to break the session key. However, protection is insufficient since the attacker can do an offline dictionary attack and break the session key. Because the number of users of an operator is limited, usually vary between a few hundred thousand to a few hundred millions, it is not difficult for an attacker to break the session key, especially when the number of users belonging to one operator is not high. Therefore, protecting the IMSI with public key cannot prevent breaking of the session key using dictionary attack.

CN 102664725 provides a security certificate method of a femtocell base station and a femtocell wireless communication system. CN 102664725 proposes a use of public key to authenticate the network. The method is valid for authentication the network. However, method for network to authenticate the UE with the public key is not provided. Therefore, the solution is not complete for cellular networks. Also, method of generating session key after authentication is not provided.

In view of the possible security threats resulting from loss of USIM card credentials, and existing solutions, improved methods and systems to address the above and other issues are highly desirable.

SUMMARY

Embodiments of the invention provide methods, apparatuses and system for session key generation, which can prevent an attacker, who may possess credentials of a USIM card, from breaking the generated session key by simply listening to signal exchanges.

According to one aspect of the invention, a method for key generation is provided. The method comprises:

during or after a mutual authentication procedure between a user equipment (UE) and a network, generating a first symmetric key and receiving a first Diffie-Hellman public key (A); generating a second symmetric key based on the first Diffie-Hellman public key (A); and generating a session key based on both the first symmetric key and the second symmetric key.

According to one aspect of the invention, a method for key generation is provided. The method comprises:

at a network entity: having a first symmetric key; generating and transmitting a first Diffie-Hellman public key (A); receiving a second Diffie-Hellman public key (B); generating a second symmetric key based on the second Diffie-Hellman public key (B); and generating a session key based on both the first symmetric key and the second symmetric key.

According to one aspect of the invention, a key generation apparatus is provided. The apparatus comprises:

a receiving unit configured to receive, from a network, at least a first Diffie-Hellman public key (A); an authentication unit configured to mutually authenticate with a network and generate at least a first symmetric key; a Diffie-Hellman procedure unit configured to generate a second symmetric secret key which is based on the first Diffie-Hellman public key (A); and a transmitting unit configured to transmit the first Diffie-Hellman public key (B); and a session key generation unit configured to generate at least a session key based on both the first symmetric key and the second symmetric key.

According to one aspect of the invention, a key generation apparatus is provided. The apparatus comprises: an authentication unit configured to mutually authenticate with a user equipment (UE) and provide at least a first symmetric key; a Diffie-Hellman procedure unit configured to generate a first Diffie-Hellman public key (A), and a second symmetric key which is based on a second Diffie-Hellman public key (B); a receiving unit configured to receive, from the UE, at least the second Diffie-Hellman public key (B); a transmitting unit configured to transmit the first Diffie-Hellman public key (A); and a session key generation unit configured to generate at least a session key based on both the first symmetric key and the second symmetric key.

According to one aspect of the invention, a communication system is provided. The communication system comprises: a user equipment which includes a key generation apparatus according to any of claims 13 to 18; and a network equipment which includes a key generation apparatus according to any of claims 19 to 24.

In respective embodiments of the above-described aspects of the invention, the first symmetric key may include K1, KASME; the second symmetric key may include KDH.

Various embodiments of the above-described aspects of the invention are further recited in the accompanying claims.

BRIEF DESCRIPTION OF THE DRAWINGS

Embodiments of the invention are disclosed hereinafter with reference to the drawings, in which.

DETAILED DESCRIPTION

Embodiments of the invention provide methods to alleviate threats resulting of exposure of credentials in the SIM card.

In one embodiment, the Diffie-Hellman (DH) procedure is applied to session key generation to prevent attackers from breaking the session key by simply listening to the signaling exchange passively when the attackers possess the credentials of USIM card. DH procedure can be based on either a Finite Field Cryptography (FFC) group or an Elliptic Curve Cryptography (ECC) group.

When FFC is used, for a given random number a, the DH procedure derives a public key as A=ga mod p, wherein the g is a generator in cyclic group G, p is a prime number and is also public modulus; and derives a shared session key as KDH=Ba mod p, wherein B is a DH public key received from peer. The values of g, G and p are pre-shared by parties involved in the DH procedure, for example, UE and CN in this invention.

When ECC is used, for a given random number a, the DH procedure derives a public key as A=aP, wherein the P is a generator (a base point on the elliptic curve), p is a prime number and is also public modulus; and derives a shared session key as KDH=aB, wherein B is a DH public key received from peer. ECC group used in this invention can be defined by the sextuple (p, c, d, P, r, h) where p is a prime number, c and d specify the elliptic curve defined by the equation, $y2=x3+cx+d$ modulo p, P is a generator (a base point on the elliptic curve), r is the prime order of P, and h is the co-factor.

Figure 3:
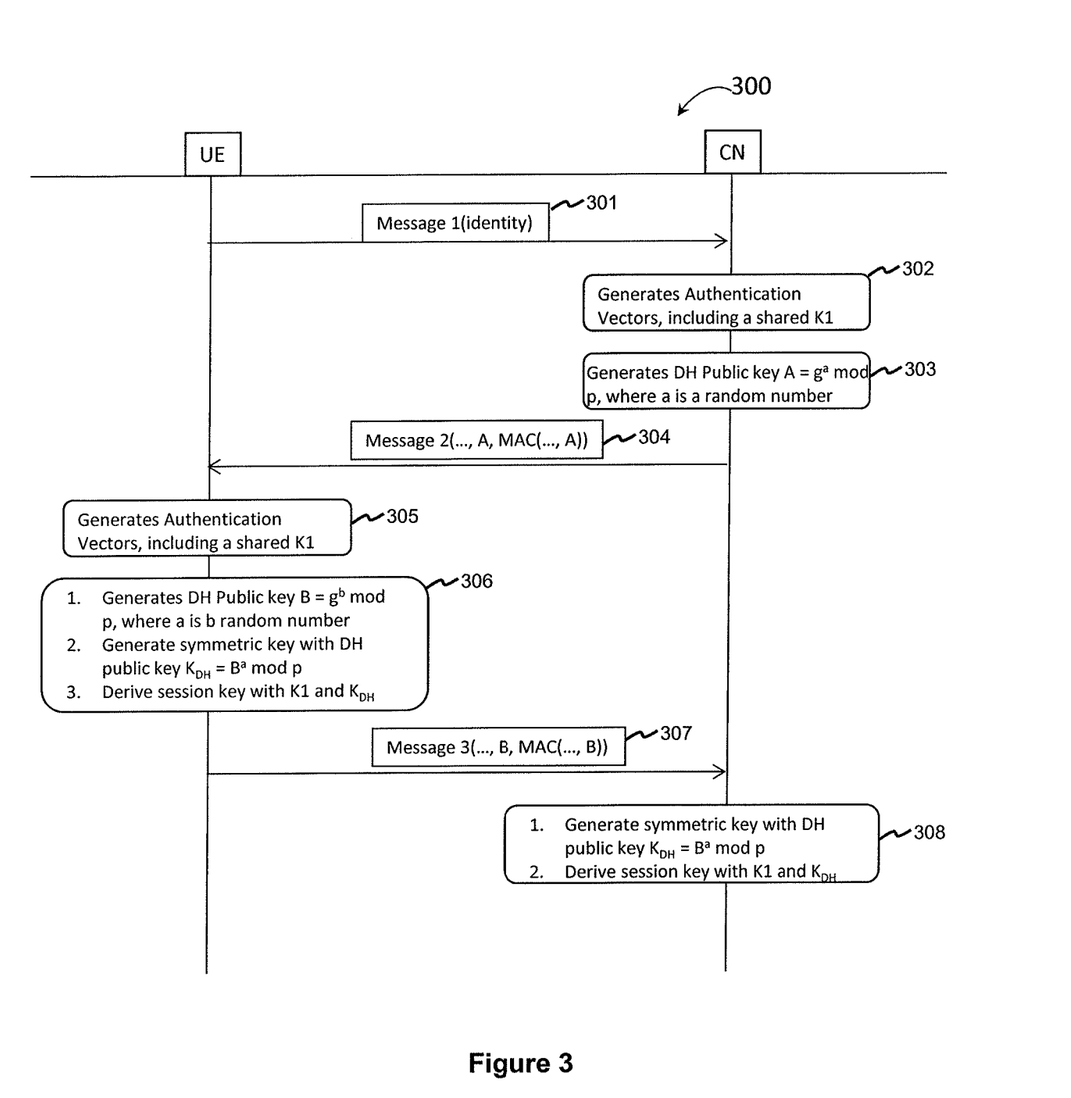
FIG. 3 is a flow chart illustrating a method for generating session key according to one embodiment of the invention.

FIG. 3 is a flow chart 300 illustrating a method for generating session key according to one embodiment of the invention. In this embodiment, a DH procedure is embedded during mutual authentication of user equipment (UE) and core network (CN).

In block 301, UE sends a first message, including identity information of the UE, to CN.

In block 302, after receiving the first message, CN generates authentication vectors based on shared credentials between UE and CN, and further generates a symmetric or shared key K1, i.e. CN-generated symmetric key.

In block 303, CN starts the DH procedure by generating or deriving a random number a, i.e. CN-generated private random number, and calculating DH public key A with use of either FFC group or ECC group.

In block 304, CN sends a second message which includes the authentication vectors and A to UE.

In block 305, after receiving the second message from CN, UE extracts the authentication vectors and A from the second message, and authenticates CN based on the received authentication vectors. Subsequently, UE generates a symmetric or shared key, i.e. UE-generated symmetric key, which is the same as K1, and other authentication vectors based on the data received in the second message.

In block 306, UE generates random number b, i.e. UE-generated private random number, and calculates DH public key with use of FFC or ECC group. For example, with use of FFC, B=gb mod p, where B is referred to as UE-generated Diffie-Hellman public key; wherein with use of ECC, B=bP.

At the same time, UE may derive or generate a DH symmetric private key KDH based on the parameters received, for example, KDH=(Ab mod p)=gba when FFC is used, or KDH=bA=baP when ECC is used. UE generates a session key K, i.e. UE-generated session key, by taking both K1 and KDH as input to a hash function or other suitable function.

In block 307, UE sends a third message which includes UE-generated authentication vectors and B to CN.

In block 308, CN authenticates UE based on the authentication vectors received in the third message. CN derives or generates a DH symmetric private key KDH=(Ba mod p)=gab when FFC is used, or KDH=aB when ECC is used, based on the parameters exchanged. Both CN-generated DH key KDH and UE-generated DH key KDH would be the same. Subsequently, CN generates a session key K, i.e. CN-generated session key, by taking both K1 and KDH as input to a hash function or other suitable function. In one embodiment, UE concatenates K1 and KDH into a concatenated string and uses the concatenated string as an input to a function, for example, K=SHA256(KASME||KDH), wherein '||' is an operator for concatenating two strings into one.

Figure 4:
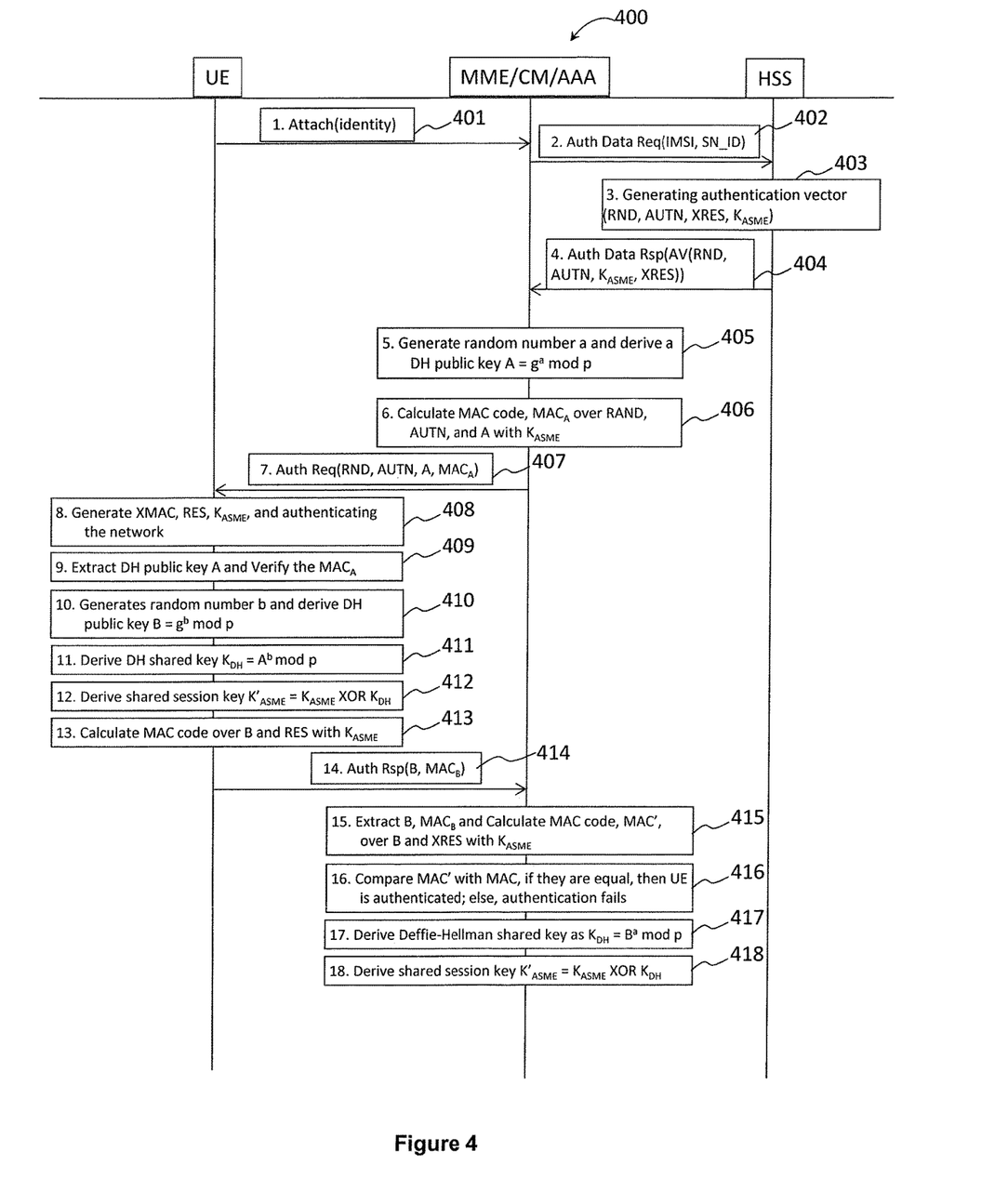
FIG. 4 is a flow chart illustrating a method for generating session key according to one embodiment of the invention wherein the core network is in a LTE network.

FIG. 4 is a flow chart 400 illustrating a method for generating session key according to one embodiment of the invention wherein the core network is provided in a LTE network. In this embodiment, a DH procedure is embedded during mutual authentication of user equipment (UE) and LTE core network. In the LTE network, before UE is able to transmit data via the network, UE has to mutually authenticate with the LTE core network which includes Mobility Management Entity (MME) and Home Subscriber Server (HSS.)

In block 401, UE sends an Attach Request to the MME with UE identity included in the request.

In block 402, upon receiving the Attach Request, MME generates an Authentication Data Request and sends this request to the HSS.

In block 403, HSS generates authentication vectors e.g. RAND (random challenge number), AUTN (authentication token), XRES (expected response), KAMSE (master key). RAND is to be used by HSS or UE to generate other authentication vectors and keys. AUTN is to be used by UE to authenticate the LTE core network. XRES is to be used by LTE core network to authenticate UE. KAMSE is a key to be used in session key generation, and may be a symmetric key similar to K1 described in relation to the flow chart of FIG. 3.

In block 404, HSS sends an Authentication Data Response to MME with the authentication vectors e.g. RAND, AUTN, XRES, KAMSE, (generated in block 403) included in this response.

In block 405, MME starts the DH procedure by generating or deriving a random number a, i.e. CN-generated private random number, and either calculating A=ga mod p, wherein g is a generator in cyclic group p is a prime number and is also public modulus, or calculating A=aP, wherein P is base point for the ECC group G A is referred to as CN-generated Diffie-Hellman public key. The values of g, G and p are pre-shared by the LTE core network and UE.

In block 406, a CN-generated MAC (Message Authentication Code), i.e. MACA, is calculated based on A, RAND, AUTN with KASME.

In block 407, MME sends an Authentication Request to UE, which includes A, RAND, AUTN, and the CN-generated MAC code calculated in block 406.

In block 408, mobile equipment (ME), which is an entity inside the UE, receives the Authentication Request. UE authenticates the LTE core network based on the MACDH contained in the Authentication Request. UE generates XMAC, RES and KASME.

In block 409, UE extracts DH public key A and MACDH from Authentication Request message. UE verifies the MACA with the KASME generated by UE.

In block 410, UE further generates another random number b, i.e. UE-generated private random number, and calculates B=gb mod p for FFC group or B=bP mod p for ECC group wherein B is UE-generated Diffie-Hellman public key.

In block 411, UE derives or generates a Diffie-Hellman key, KDH=Ab mod p.

In block 412, UE derives or generates session key K'AMSE based on KAMSE and KDH. One of the methods is to derive K'AMSE as KAMSE XOR KDH, i.e. perform an exclusive-or operation on KAMSE and KDH.

In block 413, UE calculates a MAC code, MACB, based on RES and B with KAMSE. Alternatively, UE may calculate a MAC code based on RES and B with KDH, or based on RES and B with K'AMSE.

In block 414, UE sends an Authentication Response to MME, with both B and the UE-generated MAC code, MACB, included in the response, the UE-generated MAC code was calculated in block 414. In another embodiment, UE may also include DH public key A in the MAC computation.

In block 415, after receiving the Authentication Response, MME first extracts B and UE-generated MAC code from the response. MME then calculates a MAC' code based on the B, XRES with KASME. In another embodiment, MME may also include DH public key A in the MAC computation if UE and MME agree to include it in the MAC computation.

In block 416, the MME authenticates UE by comparing network-generated MAC' with UE-generated MAC, MACB. If both values are equal, UE is successfully authenticated. If both values are unequal, UE is unsuccessfully authenticated.

In blocks 417, MME generates DH key KDH as (B)a mod p. The DH keys (A)b mod p and (B)a mod p are the same.

In block 418, MME generates a session key K'ASME by taking in both KDH and KASME, or their derivatives as input to an EPS Algorithm or other suitable functions. For example, UE may first extend number of bits of KASME by appending or padding zeros at the beginning or ending of KASME so that, after extension, the extended KASME, in number of bits, is same as KDH. In another embodiment, UE may use a function such as hash function to derive another number from KDH which has the same length as KASME in number of bits. After that, UE may perform an exclusive-or function to generate session key K'ASME=KDH XOR Pad(KASME) or K'ASME=Hash(KDH) XOR KASME. In yet another embodiment, UE may concatenate strings derived from KASME and KDH respectively and use the concatenated strings as an input to a function, for example, the KDF function defined in 3GPP standard or a given hash function such as SHA256. One example is K'ASME=SHA256(KASME||KDH), wherein '||' is an operator for concatenating two strings into one. K'ASME is then used in generation of other keys such as KNASenc, KNASint, and KeNB.

In the above example, the role of MME may be replaced by Authentication, Authorisation and Accounting (AAA) server or Connection Manager (CM) which is responsible for connection management in the next generation network and the above-described procedure would still be applicable.

Figure 5:
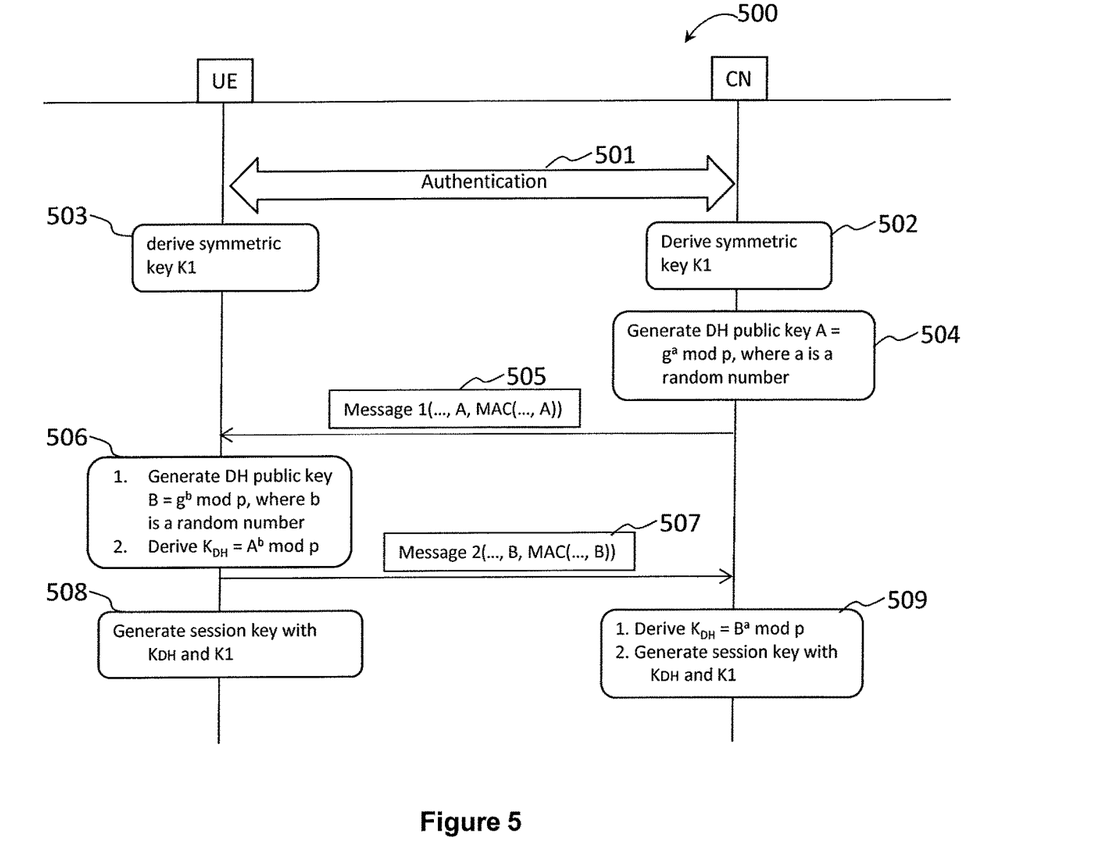
FIG. 5 is a flow chart illustrating a method for generating session key according to one embodiment of the invention.

FIG. 5 is a flow chart illustrating a method for generating session key according to one embodiment of the invention. In this embodiment, a DH procedure is embedded during exchange of management messages after mutual authentication of the UE and CN is completed.

In block 501, CN and UE mutually authenticate each other. An authentication result is generated upon completion of the mutual authentication.

In blocks 502 and 503, an integrate protection key K1, which is symmetric, is derived based on the authentication result by UE and CN respectively. Thereafter, a first message is to be sent from CN to UE or vice versa for session key derivation.

Block 504 assumes the first message is to be sent from CN to UE. The first message includes DH parameter A, wherein A=ga mod p with use of FFC group or A=aP with use of ECC group defined previously, generated by a node in the CN, where a is a random number generated by CN, i.e. CN-generated private random number. A network-generated MAC code is generated to protect the integrity of the first message to prevent an attacker from changing the value of A.

In block 505, CN sends a first message to UE, including A and the network-generated MAC code.

In block 506, after UE receives the first message, UE extracts A from the first message and checks the network-generated MAC code. If integration checking passes, then UE generates another value B, wherein B=gb mod p with FFC group or B=bP with ECC group, wherein B is UE-generated Diffie Hellman public key and b is random number generated by UE.

In block 507, UE sends a second message to CN, including B and a UE-generated MAC. In calculating the UE-generated MAC for the second message, both A and B are inputs to the MAC calculation.

In blocks 508 and 506, UE and node in CN derive or generate DH key KDH as (ga)b and (gb)a respectively with FFC group or b(aP) and a(bP) respectively with ECC group. The DH key at both UE and CN sides are the same. UE and node CN use either KDH as a base to generate session key K, or both KDH and K1 to generate session key K using a suitable function such as an exclusive-or function. This session key K derived based on KDH or both KDH and K1 may be used for deriving or generating of other keys as suggested in previous embodiment in this disclosure such as using SHA256 function.

Figure 6:
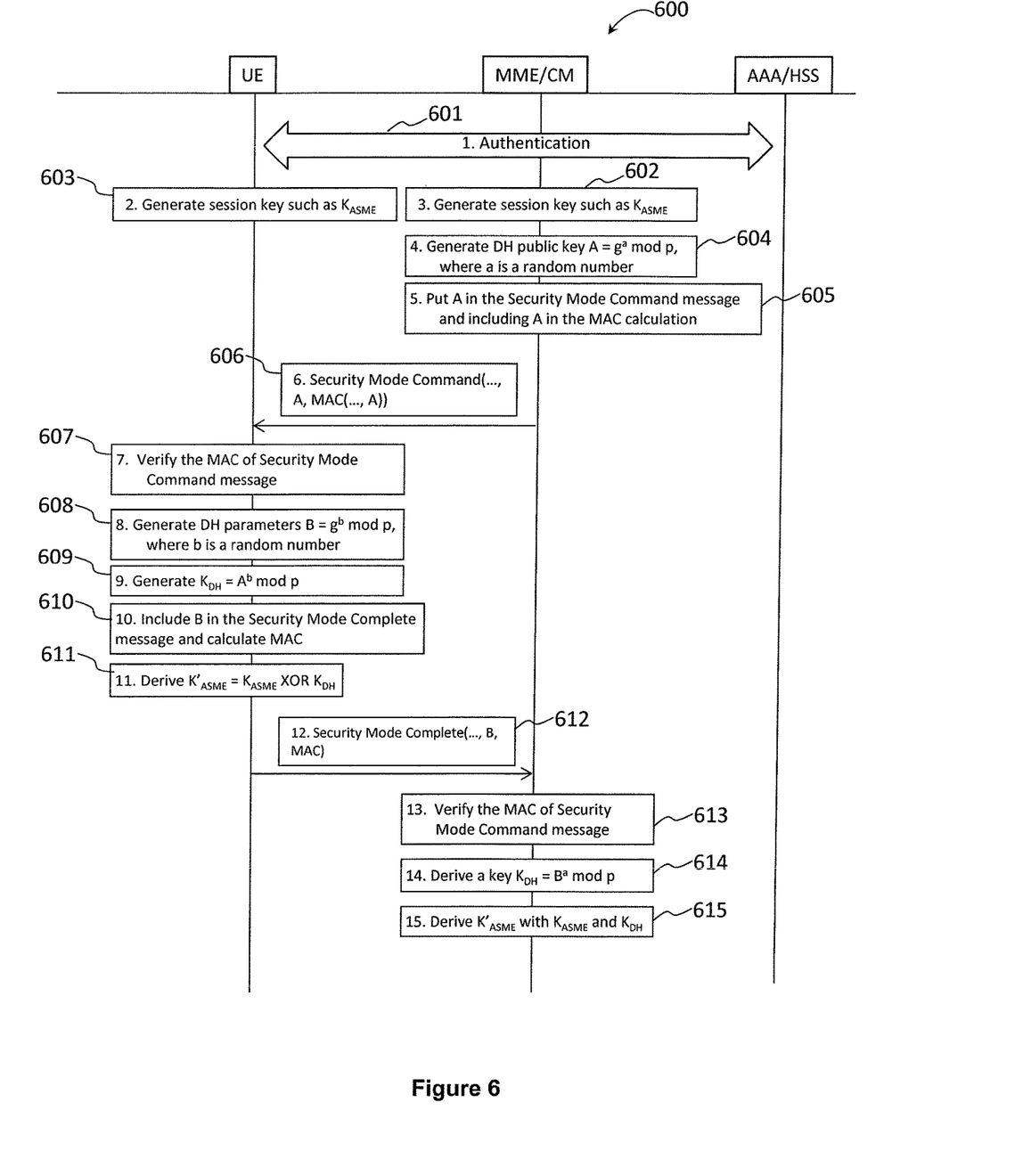
FIG. 6 is a flow chart illustrating a method for generating session key in LTE network according to one embodiment of the invention.

FIG. 6 is a flow chart 600 illustrating a method for generating session key in LTE network according to one embodiment of the invention. In this embodiment, a DH procedure is embedded after authentication of UE and LTE network is completed.

In block 601, HSS and UE mutually authenticate each other. An authentication result is generated upon completion of the mutual authentication.

In blocks 602 and 603, UE and MME separately derive or generate a master key KAMSE.

After authentication, UE and MME exchange two management messages, NAS-Security-Mode-Command and NAS-Security-Mode-Complete, to set up security context at the NAS layer. Prior to transmitting the first management message, i.e. NAS Security Mode Command message, the DH procedure is commenced.

In block 604, MME generates a random number a, i.e. CN-generated private random number, and calculates A=ga mod p with use of FFC group or A=aP with ECC group. A is referred to as CN-generated Diffie-Hellman public key. The values of g, G and p are pre-shared by the LTE core network and UE.

In block 605, MME/CM calculates MAC over parameters that will be included in the NAS-Security-Mode-Command, including the DH public key A.

In block 606, MME includes A in the NAS-Security-Mode-Command and send it to UE.

In block 607, after UE receives the above NAS-Security-Mode-Command and verifies a NAS-MAC therein, UE extracts the value A from the message.

In block 608, UE generates a random number b, i.e. UE-generated private random number, and calculates B=gb mod p with use of FFC group or B=bP with ECC group, wherein B is UE-generated Diffie-Hellman public key.

In block 609, UE derives or generates DH symmetric private key KDH as Ab mod p respectively.

In block 610, UE calculates MAC, i.e. NAS-MAC, over parameters. The NAS-MAC and DH public key B will be included in a NAS-Security-Mode-Complete message. In another embodiment, UE may also include DH public key A in the MAC computation.

In block 611, UE derives session key, K'ASME based on KASME and KDH. The methods can be similar to those suggested in previous embodiment in this document such as using SHA256 function.

In block 612, UE sends the NAS-Security-Mode-Complete message to MME with B and the relative NAS-MAC included in the message.

In block 613, after receiving the NAS-Security-Mode-Complete message, MME verifies the NAS-MAC code and extracts B for session key generation. In another embodiment, MME may also include DH public key A in the MAC computation if UE and MME agree to include the DH public key A in the NAS-MAC computation.

In block 614, MME/CM derives or generates DH symmetric private key KDH as Ba mod p with use of FFC group or aB mod p with use of ECC group. The DH keys at both UE and MME sides are the same.

In block 615, MME/CM generates a session key K'ASME for NAS layer and AS layer by taking in KDH or both KDH and KASME as input to a suitable function such as an EPS Algorithm, an exclusive-or function, KDF function defined in 3GPP specification or SHA256 hash function.

Figure 7:
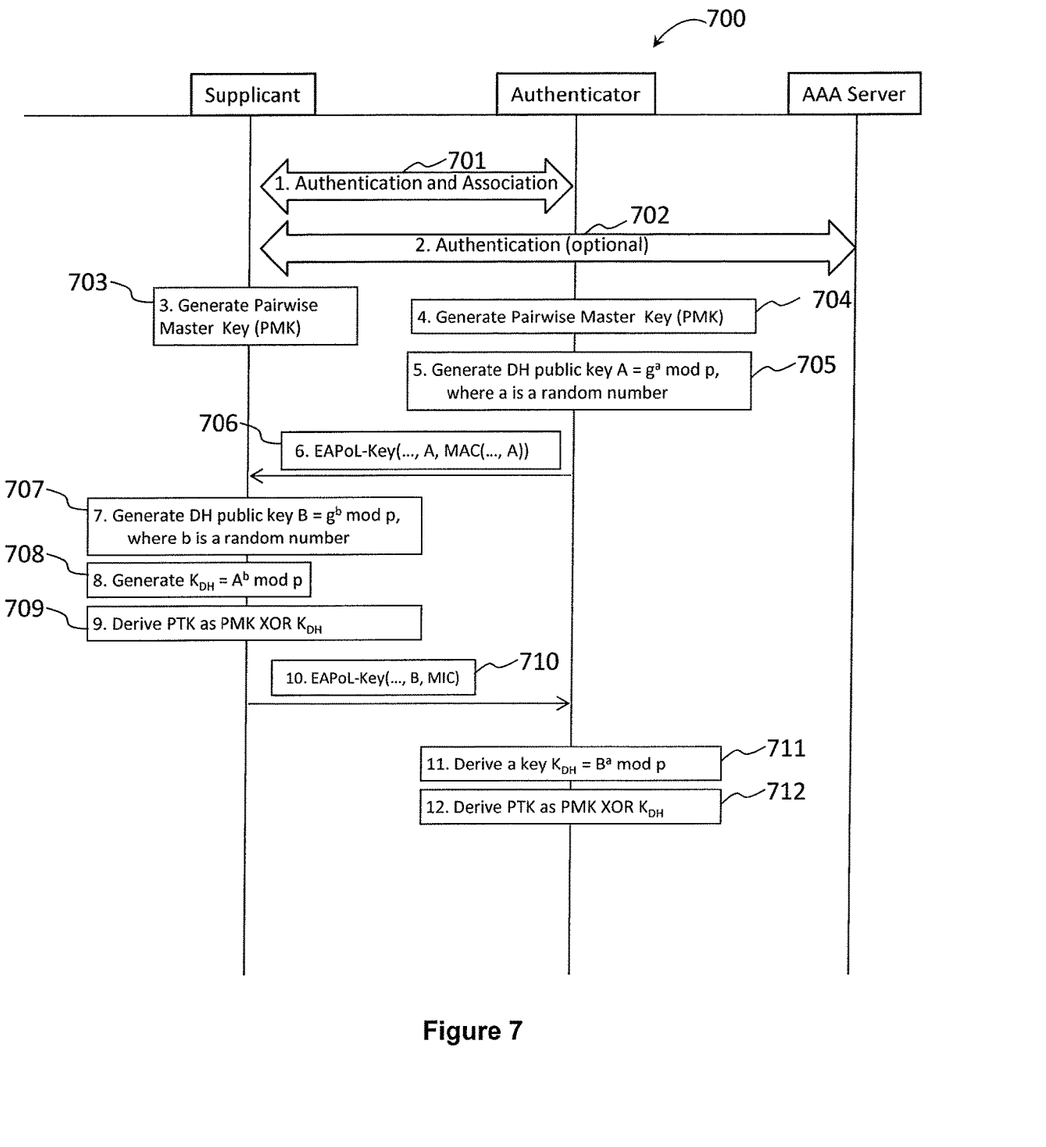
FIG. 7 is a flow chart illustrating a method for generating session key after mutual authentication in a WLAN network according to one embodiment of the invention.

FIG. 7 is a flow chart 700 illustrating a method for generating session key in Wireless Local Area Network (WLAN) according to one embodiment of the invention. In this embodiment, a DH procedure is embedded after authentication of user equipment (UE) and WLAN network is completed. UE is represented by authenticator in FIG. 7.

In block 701, supplicant first authenticates and associates with a WLAN Access Point (AP) which is represented by authenticator in FIG. 7.

In block 702, the supplicant and AAA server mutually authenticate each other. An authentication result is generated upon completion of the mutual authentication.

In blocks 703 and 704, supplicant and authenticator derive or generate a Pairwise Master Key PMK.

After authentication, supplicant and authenticator exchange two management messages, both are EAPoL-Key frames, to set up security context at the supplicant and authenticator. Prior to transmitting the first management message, i.e. EAPoL-Key, by authenticator, the DH procedure is commenced.

In block 705, authenticator generates a random number a, i.e. CN-generated private random number, and calculates DH public key A=ga mod p with FFC group or A=aP with ECC group.

In block 706, the authenticator includes A in the EAPoL-Key frame and sends it to supplicant.

In block 707, after supplicant receives the above EAPoL key, supplicant extracts the value A from the message. Thereafter, supplicant generates a random number b, i.e. UE-generated private random number, and calculates B=gb mod p with FFC group or B=bP with ECC group, wherein B is UE-generated Diffie-Hellman public key.

In block 708, supplicant also derives or generates DH key KDH as Ab mod p. Supplicant derives or generates Pairwise Transient Key PTK at least with KDH and PMK as input to a key generation function such as PRF-X as defined in the IEEE 802.11-2012 standard. Supplicant then generates a message, EAPoL-Key, which at least includes B and a Message Integrity Code (MIC). The MIC code calculated in EAPoL-Key include both A and B as inputs.

In block 709, supplicant generates a Pairwise Transient Key PTK with KDH and PMK as input to the key generation function such as PRF-X as defined in the IEEE 802.11-2012 standard. One example is that supplicant performs an XOR operation over PMK and KDH and then uses the results as an input to the PRF-X function.

In block 710, supplicant sends the EAPoL-Key frame to authenticator with B and the relative MIC included in the message.

In block 711, after receiving the EAPoL-Key frame, authenticator verifies the MIC code and extracts B for session key generation. The authenticator then derives or generates DH key KDH as Ba mod p with FFC group or aB with ECC group. The DH keys at both supplicant (for example, UE or station) and authenticator (for example, AP or controller) are the same.

In block 712, authenticator generates a Pairwise Transient Key PTK with KDH and PMK as input to the key generation function such as PRF-X as defined in the IEEE 802.11-2012 standard. In one embodiment, the authenticator performs an XOR operation over PMK and KDH and then uses the results as an input to the PRF-X function. In another embodiment, the authenticator converts the KDH and PMK and then inputs the string to either KDF function defined in the IEEE 802.11 specification or SHA256 function to derive the PTK.

Figure 8:
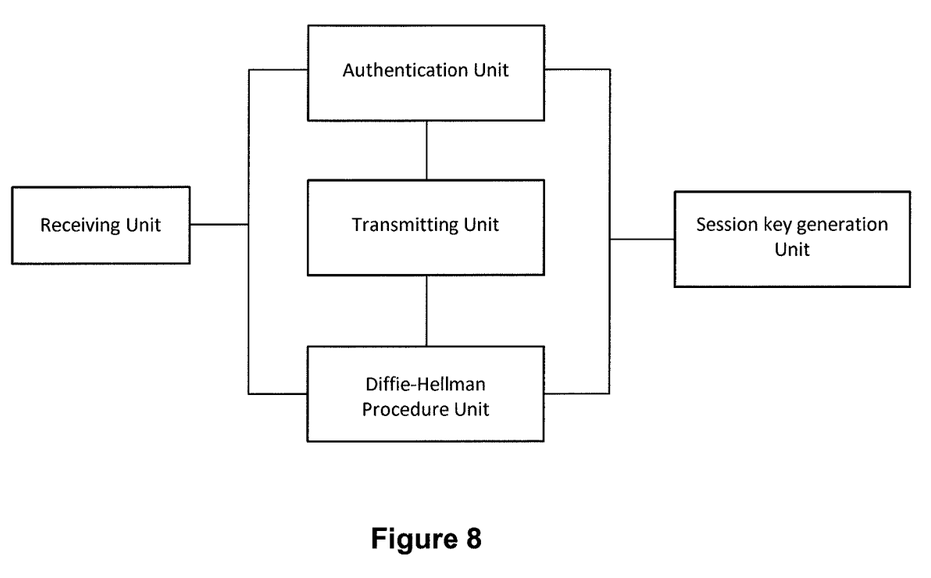
FIG. 8 is a schematic representation of a key generation apparatus.

FIG. 8 shows another embodiment of the invention that provides a key generation apparatus which may be deployed the UE and/or CN. The key generation apparatus includes:

at least one receiving unit which is configured to receive at least an authentication vector from network side equipment and Diffie-Hellman public key; at least one authentication unit which is configured to mutual authenticate with the network and generate at least the first symmetric key; at least one Diffie-Hellman procedure unit which is configured to generate at least a Diffie-Hellman public key, and the second symmetric key based on a received Diffie-Hellman public key; at least one transmitting unit which is configured to generate at least a Message Authentication Code for a Diffie-Hellman public key, transmit at least a Diffie-Hellman pubic key and a Message Authentication Code; and at least one session key generation unit which is configured to generate at least a session key based on both the first symmetric key and the second symmetric key.

In one embodiment wherein the key generation apparatus is deployed at a UE, the key generation apparatus is operative according to the accompanying claims 20 to 28.

In one embodiment wherein the key generation apparatus is deployed at a CN, the key generation apparatus is operative according to the accompanying claims 29 to 36.

Figure 9:
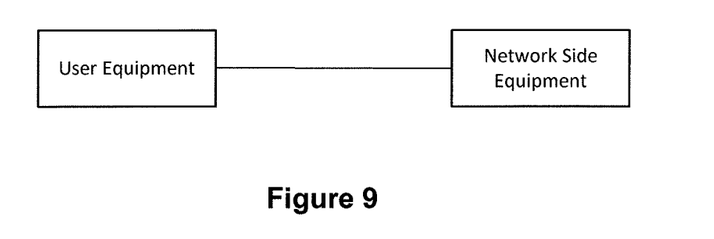
FIG. 9 is a schematic representation of a communication system.

FIG. 9 shows another embodiment of the invention that provides a communication system, the system includes both user equipment and network side equipment, including: at least one user equipment which is used to at least receive authentication vectors and Diffie-Hellman public key, transmitting at least a Diffie-Hellman public key and a Message Authentication Code, deriving or generating at least a session key based on the keys generated from the authentication procedure and the Diffie-Hellman procedure; at least one network side equipment which is used to at least transmit at least authentication vectors and a Diffie-Hellman public key, receiving at least a Diffie-Hellman public key and a Message Authentication Code, deriving or generating at least a session key based on the keys generated from the authentication procedure and the Diffie-Hellman procedure.

The communication system is operative according to the accompanying claim 37.

The above-described methods and apparatuses for generating session keys using DH procedure and mutually authentication CN with UE can be implemented in a system specified by the 3G/4G specification or a system evolved from the system specified by the 3G/4G specification which is defined by the 3GPP standard organization.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

What is claimed is:

1. A method, comprising:
    sending, by a mobility management entity (MME), an authentication data request to a home subscriber server (HSS);
    receiving, by the MME, an authentication vector from the HSS;
    calculating, by the MME, a first Diffie-Hellman public key based on a random number;
    calculating, by the MME, a first message authentication code (MAC) based on the first Diffie-Hellman public key and the authentication vector;
    sending, by the MME, an authentication request to a user equipment (UE), wherein the authentication request comprises the first MAC and the first Diffie-Hellman public key;
    receiving, by the MME, an authentication response from the UE, wherein the authentication response comprises a second Diffie-Hellman public key and a second MAC;
    authenticating, by the MME, the second MAC;
    generating, by the MME, a second symmetric key based on the second Diffie-Hellman public key and the random number when the second MAC is authenticated successfully;
    generating, by the MME, a session key based on a first symmetric key and the second symmetric key;
    generating, by the MME, a security key based on the session key; and
    encrypting, by the MME, data using the security key before sending the data to the UE, wherein the authenticating the second MAC comprising:
    calculating, by the MME, a third MAC based on the second Diffie-Hellman public key; and comparing, by the MME, the second MAC with the third MAC,
wherein the MME generates the session key by:
K'ASME=Hash (KDH) XOR KASME,
wherein the K'ASME is the session key, the KASME is the first symmetric key, the KDH is the second symmetric key, the XOR is an exclusive-or function.

2. The method of claim 1, wherein the first symmetric key is known by the UE and the MME.

3. The method of claim 1, wherein the MME generates the session key by:
K'ASME=SHA256(KASME∥KDH);
wherein the K'ASME is the session key, the KASME is the first symmetric key, the KDH is the second symmetric key, '∥' is an operator for concatenating two strings into one and the SHA256 is a hash function.

4. A method, comprising:
receiving, by a user equipment (UE), an authentication request from a mobility management entity (MME), wherein the authentication request includes a first Diffie-Hellman public key and a first message authentication code (MAC);
authenticating, by the UE, the first MAC;
generating, by the UE, a second Diffie-Hellman public key when the first MAC is authenticated successfully;
sending, by the UE, an authentication response including the second Diffie-Hellman public key and a second MAC to the MME;
generating, by the UE, a second symmetric key based on the first Diffie-Hellman public key;
generating, by the UE, a session key based on a first symmetric key and the second symmetric key;
generating, by the UE, a security key based on the session key; and
encrypt, by the UE, data using the security key before sending the data to the MME, wherein the authenticating the first MAC comprising:
calculating, by the UE, a third MAC based on the first Diffie-Hellman public key; and
comparing, by the UE, the first MAC with the third MAC,
wherein the UE generates the session key by:
K'ASME=Hash (KDH) XOR KASME,
wherein the K'ASME is the session key, the KASME is the first symmetric key, the KDH is the second symmetric key, the XOR is an exclusive-or function.

5. The method of claim 4, wherein the first symmetric key is known by the UE and the MME.

6. The method of claim 4, wherein the second Diffie-Hellman public key=gb mod p;
wherein g is a generator in cyclic group G, p is a prime number and is also public modulus and b is a random number.

7. The method of claim 4, wherein the second Diffie-Hellman public key=bP;
wherein P is base point for an Elliptic Curve Cryptography (ECC) group G and b is a random number.

8. The method of claim 4, wherein the UE generates the session key by:
K'ASME=SHA256(KASME∥KDH),
wherein the K'ASME is the session key, the KASME is the first symmetric key, the KDH is the second symmetric key, '∥' is an operator for concatenating two strings into one and the SHA256 is a hash function.

9. An apparatus, comprising:
a transceiver, configured to send an authentication data request to a home subscriber server (HSS) and receive an authentication vector from the HSS; and
a processor, configured to calculate a first Diffie-Hellman public key based on a random number; and calculate a first message authentication code (MAC) based on the first Diffie-Hellman public key and the authentication vector;
wherein the transceiver is further configured to:
send an authentication request to a user equipment (UE), wherein the authentication request comprises the first MAC and the first Diffie-Hellman public key; and
receive an authentication response from the UE, wherein the authentication response comprises a second Diffie-Hellman public key (B) and a second MAC;
wherein the processor is further configured to:
authenticate the second MAC;
generate a second symmetric key based on the second Diffie-Hellman public key and the random number when the second MAC is authenticated successfully;
generate a session key based on a first symmetric key and the second symmetric key;
generate a security key based on the session key; and
encrypt data using the security key before sending the data to the UE,
wherein the processor is configured to:
calculate a third MAC based on the second Diffie-Hellman public key; and
compare the second MAC with the third MAC,
wherein the processor is configured to generates the session key by:
K'ASME=Hash (KDH) XOR KASME,
wherein the K'ASME is the session key, the KASME is the first symmetric key, the KDH is the second symmetric key, the XOR is an exclusive-or function.

10. The apparatus of claim 9, wherein the first symmetric key is known by the UE and the apparatus.

11. The apparatus of claim 9, wherein the processor is configured to generate the session key by:
K'ASME=SHA256(KASME∥KDH),
wherein the K'ASME is the session key, the KASME is the first symmetric key, the KDH is the second symmetric key, '∥' is an operator for concatenating two strings into one and the SHA256 is a given hash function.

12. A user equipment, comprising:
a transceiver, configured to: receive an authentication request from a mobility management entity (MME), wherein the authentication request includes a first Diffie-Hellman public key and a first message authentication code (MAC); and
a processor, configured to:
authenticate the first MAC;
generate a second Diffie-Hellman public key when the first MAC is authenticated successfully;
generate a second symmetric key based on the first Diffie-Hellman public key;
generate a session key based on a first symmetric key and the second symmetric key;
generate a security key based on the session key; and
encrypt data using the security key before sending the data to the MME;
wherein the transceiver is further configured to: send an authentication response including the second Diffie-Hellman public key and a second MAC to the MME,
wherein the processor is further configured to:
calculate a third MAC based on the first Diffie-Hellman public key; and
compare the first MAC with the third MAC, wherein the processor is configured to generates the session key by:

K'ASME=Hash (KDH) XOR KASME, wherein the K'ASME is the session key, the KASME is the first symmetric key, the KDH is the second symmetric key, the XOR is an exclusive-or function.

13. The user equipment of claim 12, wherein the first symmetric key is known by the user equipment and the MME.

14. The user equipment of claim 12, wherein the second Diffie-Hellman public key=gb mod p, wherein g is a generator in cyclic group G, p is a prime number and is also public modulus and b is a random number.

15. The user equipment of claim 12, wherein the second Diffie-Hellman public key=bP, wherein P is base point for an Elliptic Curve Cryptography (ECC) group G and b is a random number.

16. The user equipment of claim 12, wherein the processor is configured to generate the session key by:

K'ASME=SHA256(KASME∥KDH);

wherein the K'ASME is the session key, the KASME is the second symmetric key, the KDH is the first symmetric key, '∥' is an operator for concatenating two strings into one and the SHA256 is a hash function.

* * * * *